(12) United States Patent
Hanumante et al.

(10) Patent No.: US 11,719,939 B2
(45) Date of Patent: Aug. 8, 2023

(54) EYEWEAR DEVICE DYNAMIC POWER CONFIGURATION

(71) Applicant: Snap Inc., Santa Monica, CA (US)

(72) Inventors: Sumant Hanumante, Aliso Viejo, CA (US); Bernhard Jung, Perchtoldsdorf (AT); Matthias Kalkgruber, Vienna (AT); Anton Kondratenko, San Ramon, CA (US); Edward Lee Kim-Koon, Venice, CA (US); Gerald Nilles, Culver City, CA (US); John James Robertson, Los Angeles, CA (US); Dmitry Ryuma, Sherman Oaks, CA (US); Alexander Sourov, Seattle, WA (US); Daniel Wolf, Modling (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/739,551

(22) Filed: May 9, 2022

(65) Prior Publication Data
US 2022/0365348 A1    Nov. 17, 2022

Related U.S. Application Data

(60) Provisional application No. 63/189,483, filed on May 17, 2021.

(51) Int. Cl.
*G02B 27/01*    (2006.01)
*G06F 3/01*    (2006.01)
(Continued)

(52) U.S. Cl.
CPC ............ *G02B 27/0172* (2013.01); *G01K 7/00* (2013.01); *G06F 1/26* (2013.01); *G06F 3/011* (2013.01); *G06T 19/006* (2013.01); *G01K 2215/00* (2013.01); *G02B 27/0093* (2013.01); *G02B 2027/014* (2013.01); *G02B 2027/0138* (2013.01); *G02B 2027/0178* (2013.01)

(58) Field of Classification Search
CPC ............ G02B 27/0172; G02B 27/0093; G02B 2027/0138; G02B 2027/014;
(Continued)

(56) References Cited

U.S. PATENT DOCUMENTS 5,944,829 A    8/1999  Shimoda
10,817,307 B1  10/2020 Chanterac et al.
(Continued)

OTHER PUBLICATIONS

International Search Report and Written Opinion for International Application No. PCT/US2022/028295, dated Aug. 19, 2022 (dated Aug. 19, 2022)—13 pages.

*Primary Examiner* — Dmitriy Bolotin
(74) *Attorney, Agent, or Firm* — Culhane Meadows PLLC; Stephen J. Weed

(57) ABSTRACT

Devices and methods for dynamic power configuration (e.g., reduction) for thermal management (e.g., mitigation) in a wearable electronic device such as an eyewear device. The wearable electronic device monitors its temperature and, responsive to the temperature, configures the services is provides to operate in different modes for thermal mitigation (e.g., to prevent overheating). For example, based on temperature, the wearable electronic device adjusts sensors (e.g., turns cameras on or off, changes the sampling rate, or a combination thereof) and adjusts display components (e.g., adjusted rate at which a graphical processing unit generates images and a visual display is updated). This enables the wearable electronic device to consume less power when temperatures are too high in order to provide thermal mitigation.

20 Claims, 14 Drawing Sheets

(51) Int. Cl.
    *G06T 19/00*     (2011.01)
    *G06F 1/26*     (2006.01)
    *G01K 7/00*     (2006.01)
    *G02B 27/00*     (2006.01)

(58) Field of Classification Search
    CPC ............ G02B 2027/0178; G01K 7/00; G01K 2215/00; G06F 1/26; G06F 3/011; G06T 19/006
    See application file for complete search history.

(56) References Cited

U.S. PATENT DOCUMENTS

| | | | |
|---|---|---|---|
| 2006/0010332 A1* | 1/2006 | Nakamura | G06F 1/3284 |
| | | | 713/323 |
| 2006/0182021 A1* | 8/2006 | Kristensen | H04W 52/267 |
| | | | 370/328 |
| 2011/0249022 A1* | 10/2011 | Poornachandran | G09G 5/363 |
| | | | 345/522 |
| 2018/0216990 A1* | 8/2018 | Rothwell | G01H 1/00 |
| 2018/0222391 A1* | 8/2018 | Chen | H04N 5/772 |
| 2018/0288137 A1* | 10/2018 | Veeramani | H04L 67/34 |
| 2018/0329465 A1 | 11/2018 | Tavakoli et al. | |
| 2018/0341329 A1* | 11/2018 | San Agustin Lopez | ............ |
| | | | H04N 5/2354 |
| 2019/0187765 A1 | 6/2019 | Ashwood et al. | |
| 2022/0019282 A1* | 1/2022 | Zhou | G06F 3/011 |
| 2022/0155595 A1* | 5/2022 | Wang | G06F 3/147 |
| 2022/0263006 A1* | 8/2022 | Dussaliyev | F24S 23/71 |

* cited by examiner

EYEWEAR DEVICE DYNAMIC POWER CONFIGURATION

CROSS-REFERENCE TO RELATED APPLICATIONS

This application claims priority to U.S. Provisional Application Ser. No. 63/189,483 filed on May 17, 2021, the contents of which are incorporated fully herein by reference.

TECHNICAL FIELD

Examples set forth in the present disclosure relate to the field of augmented reality (AR) and wearable electronic devices such as eyewear devices. More particularly, but not by way of limitation, the present disclosure describes dynamic power configuration for wearable electronic devices such as eyewear devices for thermal management.

BACKGROUND

Wearable electronic devices use various sensors to determine their position within a physical environment. Augmented reality (AR), virtual reality (VR) and extended reality (XR) devices generate and present visual overlays on displays for viewing by a user. Sensors and displays consume power and generate heat.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
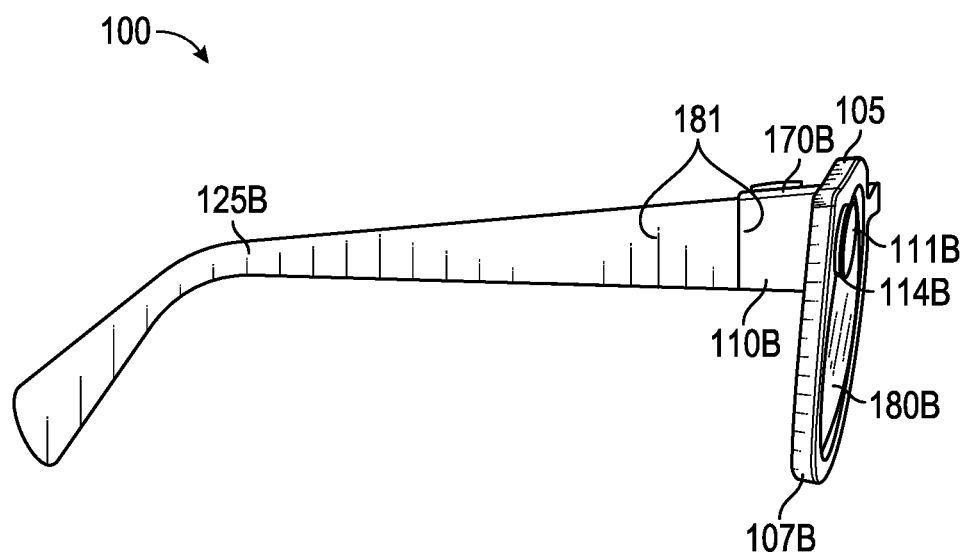
FIG. 1A is a side view (right) of an example hardware configuration of an eyewear device suitable for use in a power mode configuration system.

Various implementations and details are described with reference to examples including methods of dynamic power configuration (e.g., reduction) for thermal management (e.g., mitigation) in a wearable electronic device such as an eyewear device. The wearable electronic device monitors its temperature and, responsive to the temperature, configures the services is provides to operate in different modes for thermal mitigation (e.g., to prevent overheating). The modes may include a normal operating mode when the temperature is below a predefined range or level and a reduced power operating mode when the temperature is at or above a predefined range or level). For example, based on temperature, an eyewear device adjusts sensors (e.g., turn cameras on or off, change the sampling rate, or a combination thereof) and adjusts display components (e.g., rate at which a graphical processing unit generates images and the rate at which a visual display is updated). This enables the device to consume less power when temperatures are too high in order to provide thermal mitigation.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the device and associated components and any other complete devices incorporating a camera and/or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera and/or inertial measurement unit as constructed as otherwise described herein.

In one example, an eyewear device provides augmented reality services. The eyewear device includes a frame configured to be worn on a head of a user, a camera system supported by the frame, the camera system comprising a first camera and a second camera, a display system supported by the frame, a temperature sensor supported by the frame, the temperature sensor configured to detect a temperature of the eyewear device, and electronics supported by the frame, the electronics coupled to the camera system, the display system, and the temperature sensor, the electronics having at least two power configuration modes and comprising a processing system. The processing system is configured to run application services of the eyewear device, at least one of the application services configured to use at least one of the camera system or the display system; monitor the temperature of the temperature sensor, compare the monitored temperature to a threshold temperature, notify the at least one application service of an upcoming change from a first of the at least two power configuration modes to a second of the at least two power configuration modes responsive to the monitored temperature reaching the threshold temperature, and change the electronics from the first power configuration mode to the second power configuration mode after notifying the at least one application service.

In another example, a method for use with an eyewear device that provides augmented reality services includes running application services on electronics of the eyewear device, at least one application service configured to use at least one of a camera system or a display system monitoring a temperature of the eyewear device, comparing the monitored temperature to a threshold temperature, notifying the at least one application service of an upcoming change from a first of at least two power configuration modes for the electronics to a second of at least two power configuration modes for the electronics responsive to the monitored temperature reaching the threshold temperature, and changing the electronics from the first power configuration mode to the second power configuration mode after notifying the application services.

In another example, a non-transitory computer readable medium includes instructions for configuring an eyewear device that provides augmented reality services. The instructions, when executed by a processing system of the eyewear device configure the processing system to perform functions including running application services on electronics of the eyewear device, at least one application service configured to use at least one of a camera system or a display system monitoring a temperature of the eyewear device, comparing the monitored temperature to a threshold temperature, notifying the at least one application service of an upcoming change from a first of at least two power configuration modes for the electronics to a second of at least two power configuration modes for the electronics responsive to the monitored temperature reaching the threshold temperature, and changing the electronics from the first power configuration mode to the second power configuration mode after notifying the application services.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to up) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
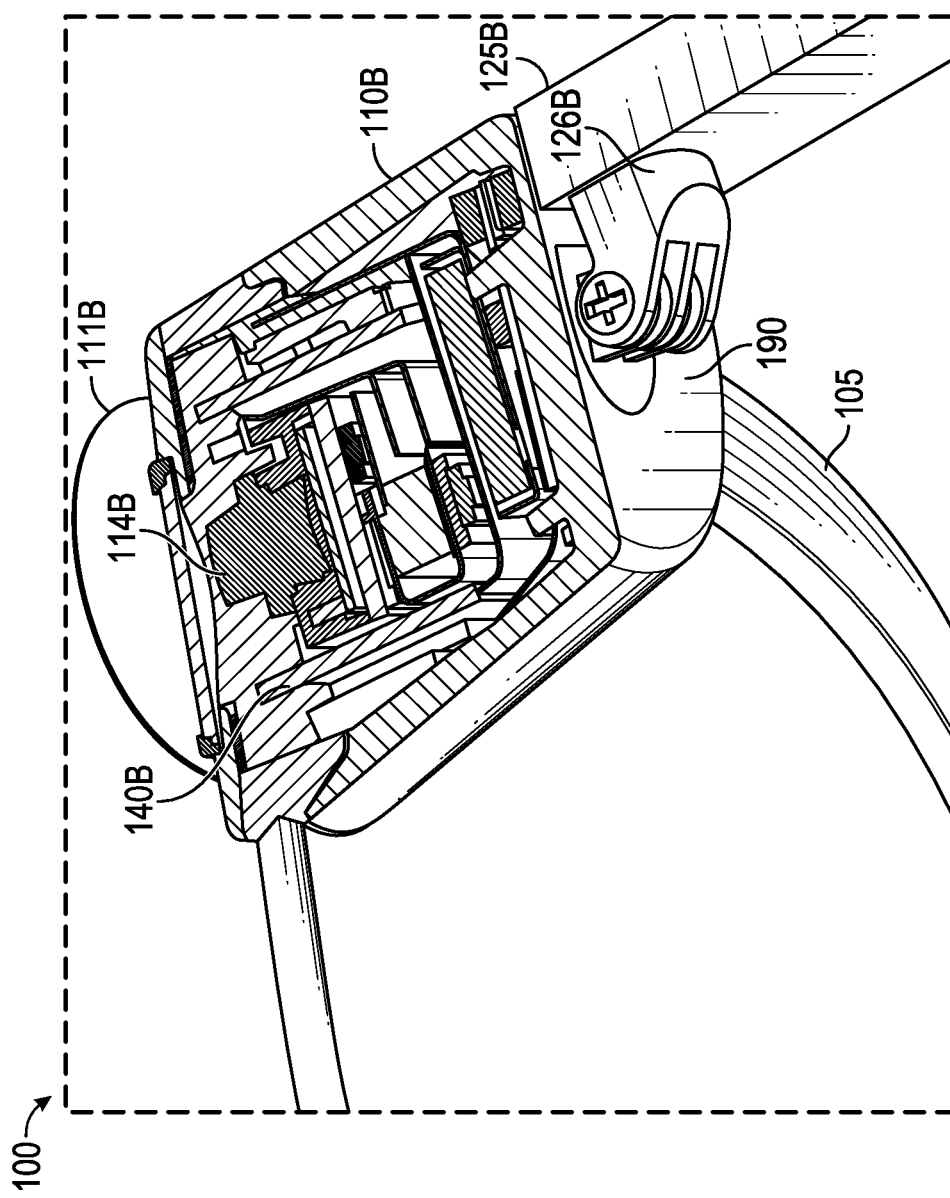
FIG. 1B is a perspective, partly sectional view of a right corner of the eyewear device of FIG. 1A depicting a right visible-light camera, and a circuit board.
Figure 1C:
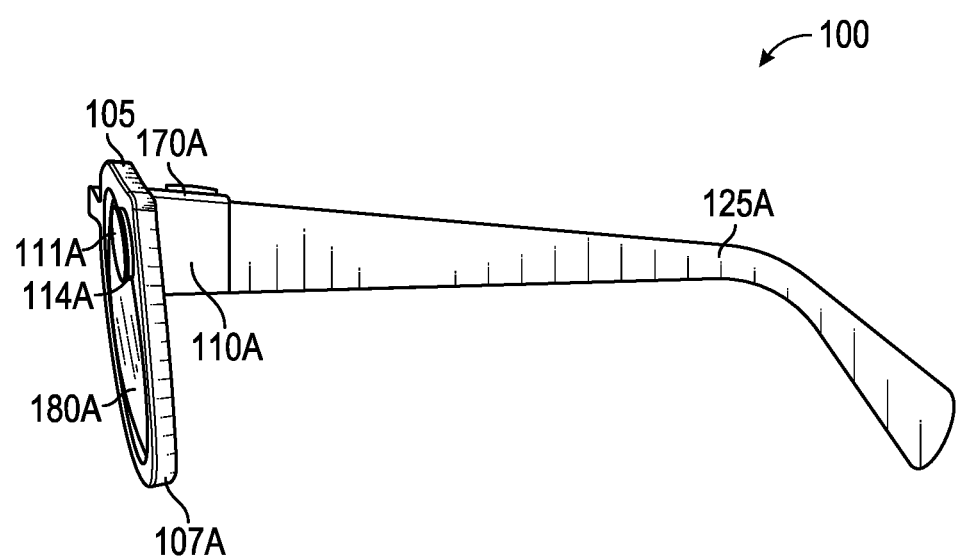
FIG. 1C is a side view (left) of an example hardware configuration of the eyewear device of FIG. 1A, which shows a left visible-light camera.
Figure 1D:
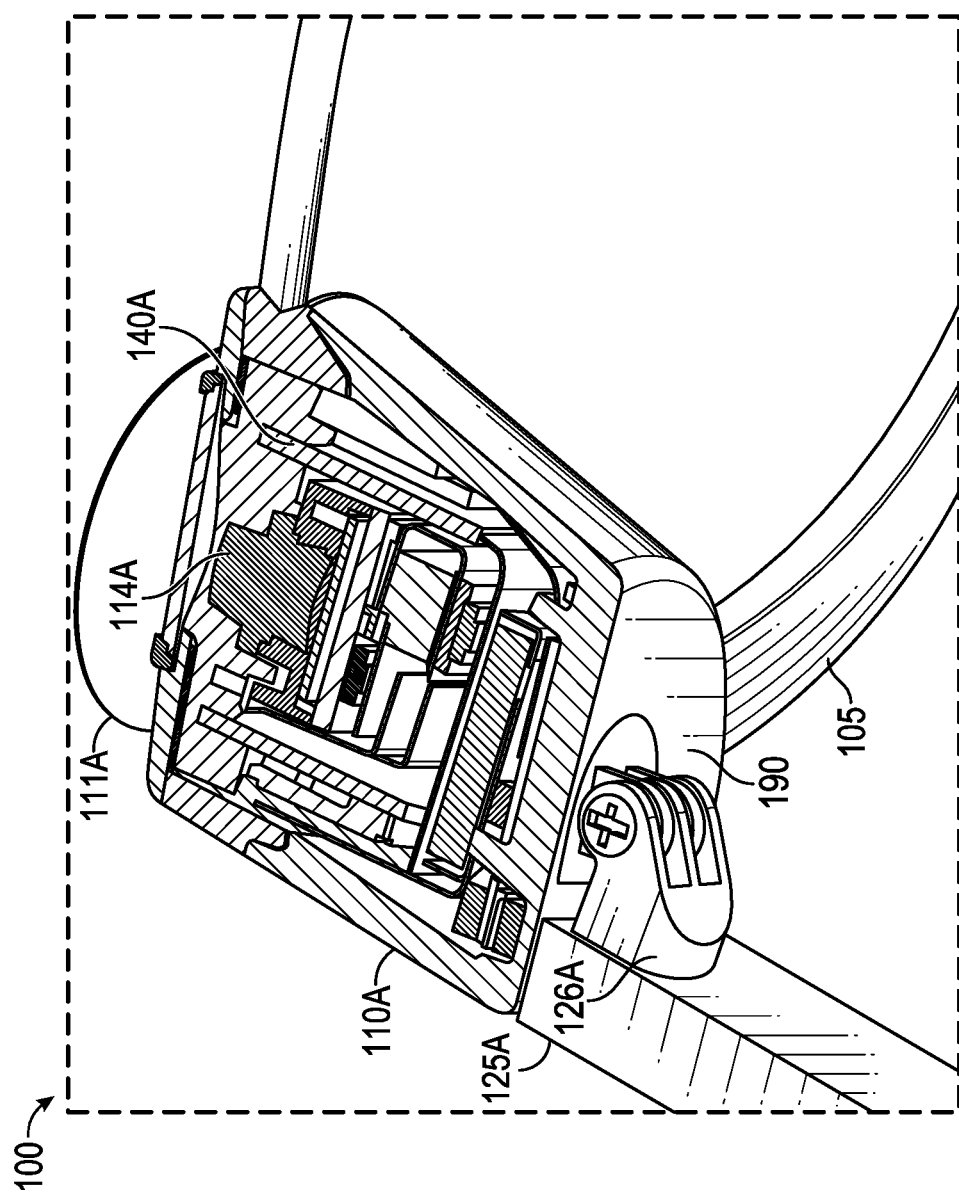
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
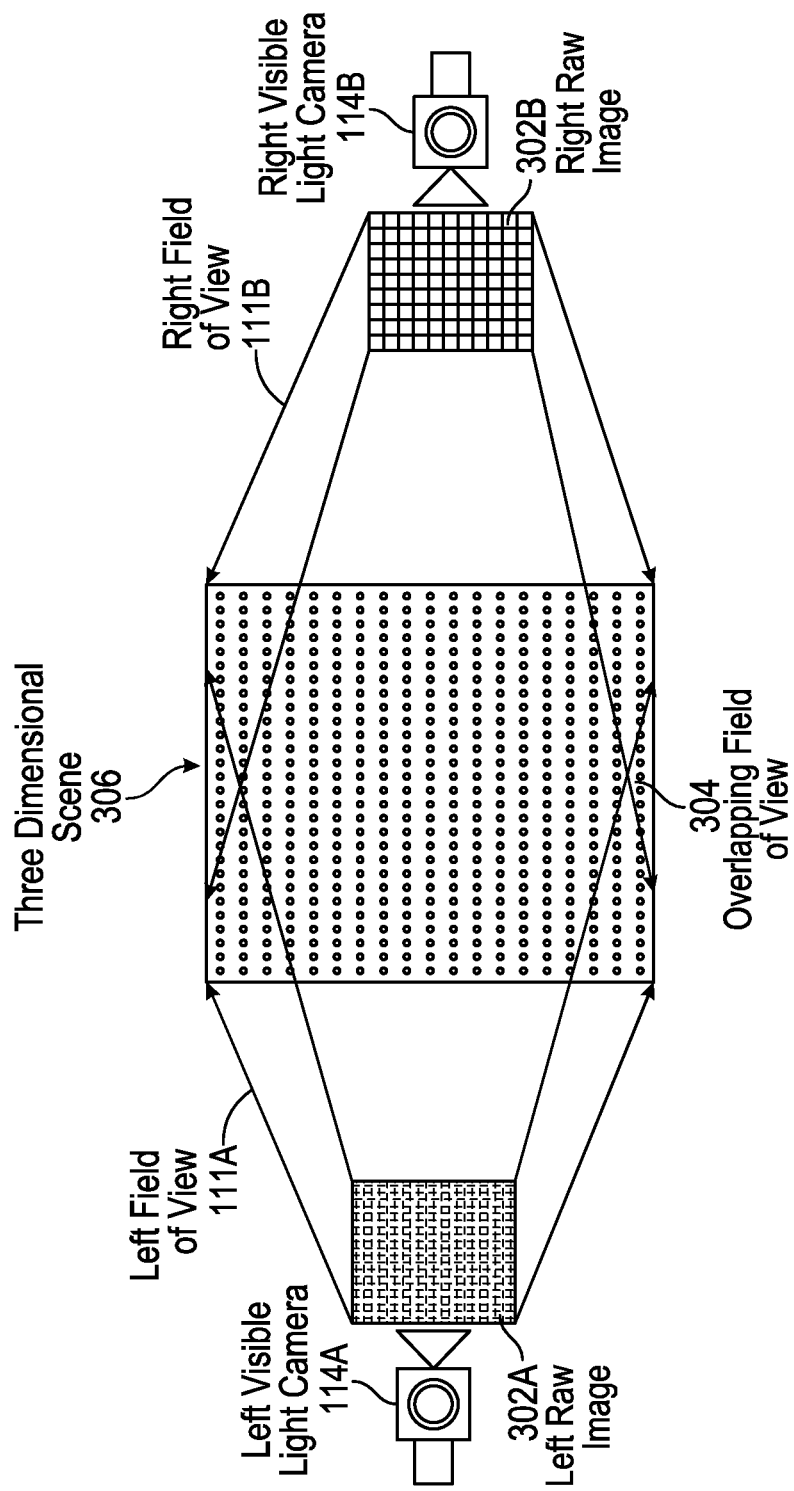
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 40° to 110°, for example approximately 100°, and have a resolution of 480×480 pixels or greater. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. The cameras 114A, 114B may be rolling shutter cameras in which lines of the sensor array are sequentially exposed or global shutter cameras in which all lines of the sensor array are disclosed at the same time. Other examples of visible-light cameras 114A, 114B may be used that can, for example, capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR), augmented reality (AR), and video gaming.

FIG. 1B is a perspective, cross-sectional view of a right corner 110B of the eyewear device 100 of FIG. 1A depicting the right visible-light camera 114B of the camera system, and a circuit board 140B. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board 140A. Construction and placement of the left visible-light camera 114A is substantially similar to the right visible-light camera 114B, except the connections and coupling are on the left lateral side 170A.

As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
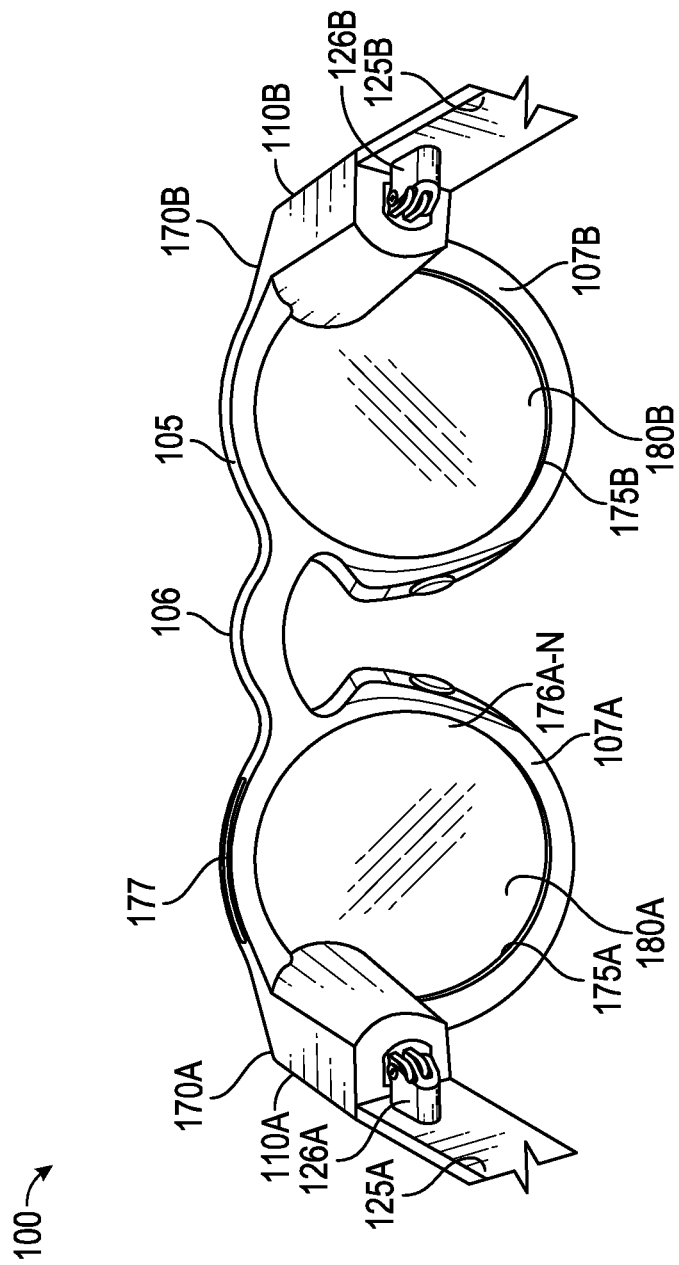
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

As shown in the example of FIG. 1D, the eyewear device 100 includes the left visible-light camera 114A and a circuit board 140A, which may be a flexible printed circuit board (PCB). The left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The left corner 110A includes corner body 190 and a corner cap, with the corner cap omitted in the cross-section of FIG. 1D. Disposed inside the left corner 110A are various interconnected circuit boards, such as PCBs or flexible PCBs, that include controller circuits for left visible-light camera 114A, microphone(s), low-power wireless circuitry (e.g., for wireless short range network communication via Bluetooth™), high-speed wireless circuitry (e.g., for wireless local area network communication via Wi-Fi).

The left visible-light camera 114A is coupled to or disposed on the flexible PCB 140A and covered by a visible-light camera cover lens, which is aimed through opening(s) formed in the frame 105. For example, the left rim 107A of the frame 105, shown in FIG. 2A, is connected to the left corner 110A and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the left visible-light camera 114A has an outward-facing field of view 111A (shown in FIG. 3) with a line of sight or perspective that is correlated with the left eye of the user of the eyewear device 100. The visible-light camera cover lens can also be adhered to a front side or outward-facing surface of the left corner 110A in which an opening is formed with an outward-facing angle of coverage, but in a different outwardly direction. The coupling can also be indirect via intervening components.

As shown in FIG. 1D, flexible PCB 140A is disposed inside the left corner 110A and is coupled to one or more other components housed in the left corner 110A. Although shown as being formed on the circuit boards of the left corner 110A, the left visible-light camera 114A can be formed on the circuit boards of the right corner 110B, the temples 125A, 125B, or the frame 105.

Figure 2B:
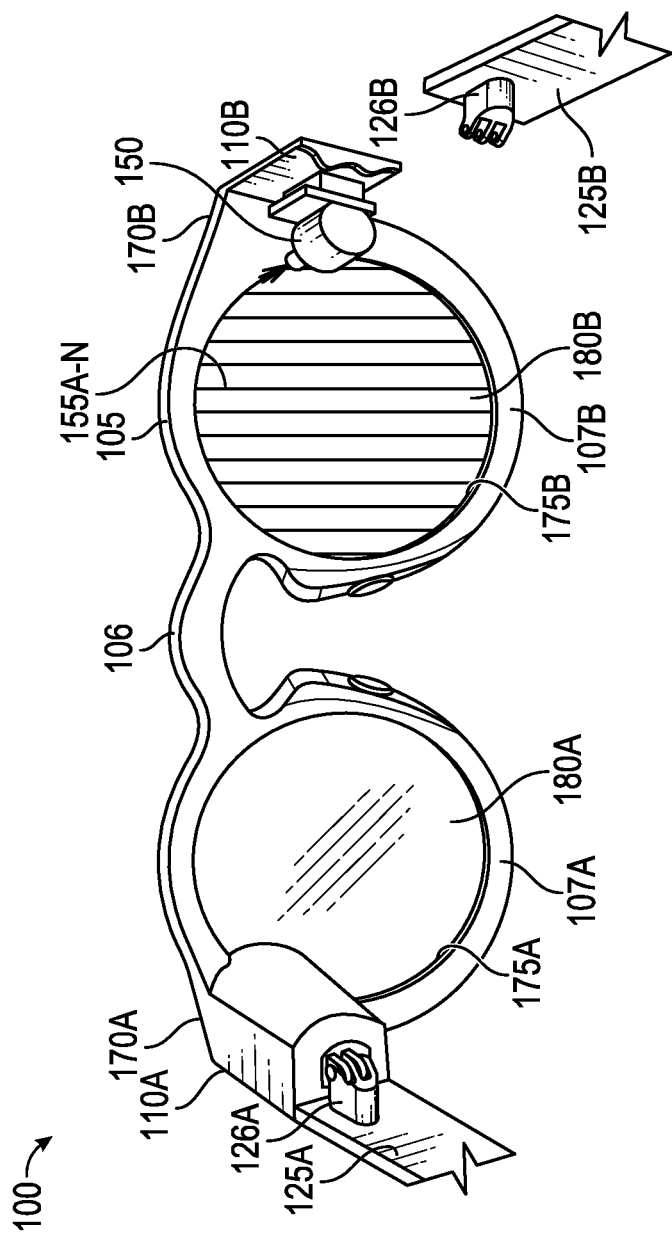

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, the eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, the eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix (not shown) or a left set of optical strips (not shown), which are configured to interact with light from the left projector. Similarly, the right optical assembly 180B may include a right display matrix (not shown) or a right set of optical strips 155A, 155B, . . . 155N, which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

Figure 4:
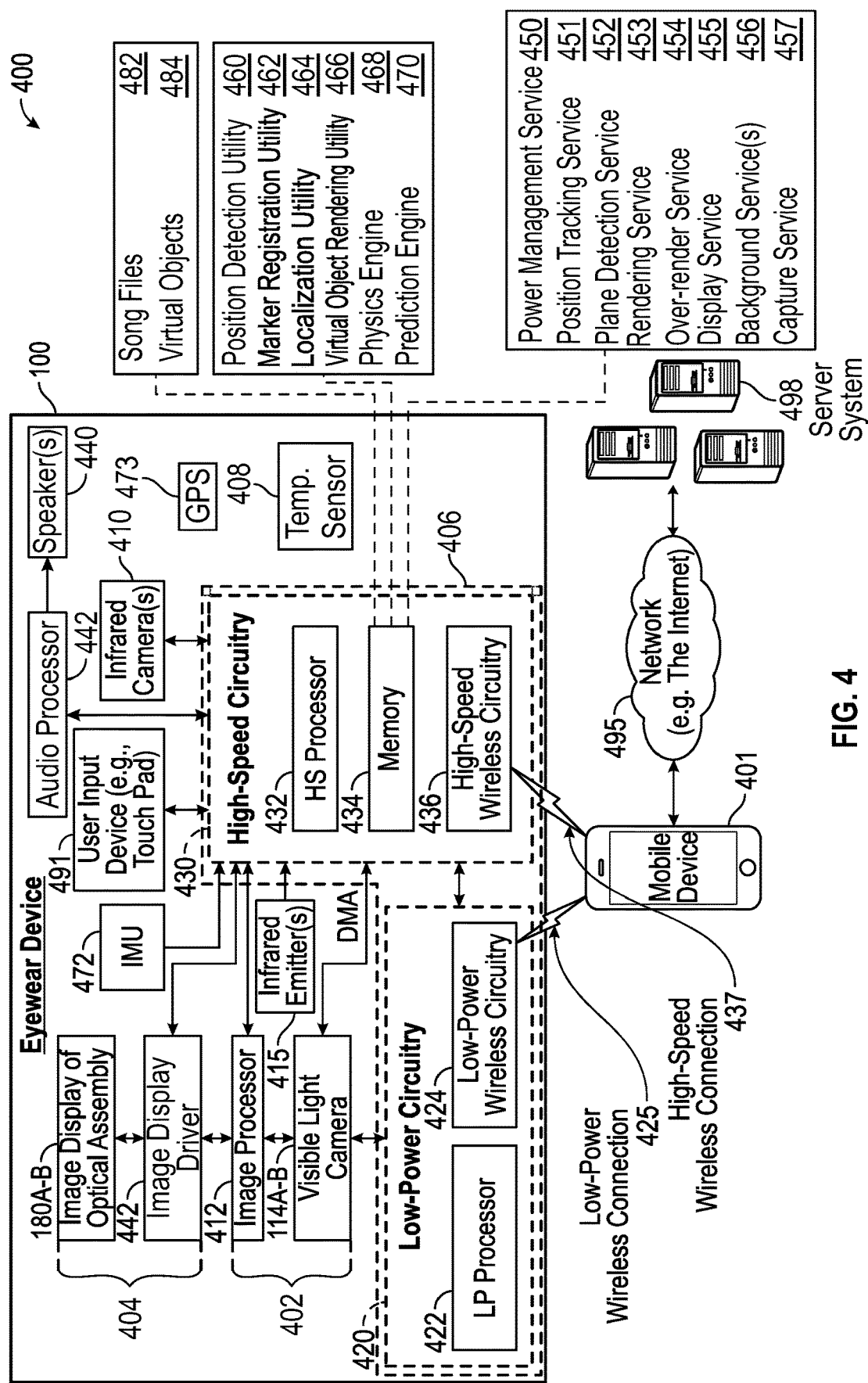
FIG. 4 is a functional block diagram of an example power mode configuration system including a wearable electronic device (e.g., an eyewear device) that implements an augmented reality production system and a server system connected to the wearable electronic device via various networks.
Figure 5:
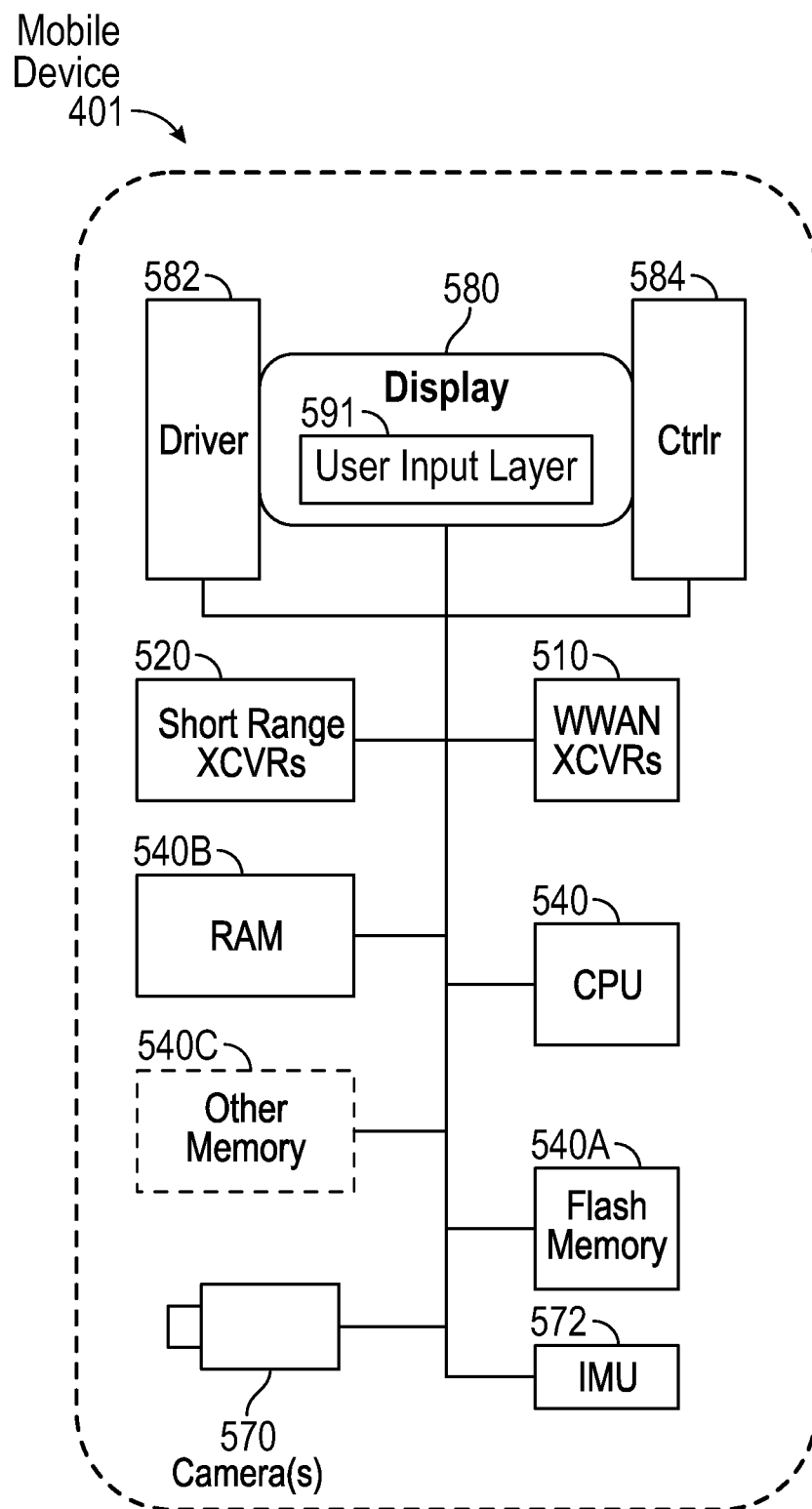
FIG. 5 is a diagrammatic representation of an example hardware configuration for a mobile device of the augmented reality production system of FIG. 4.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412; FIG. 4), depth images are generated. The generated depth images may be viewed on an optical assembly 180A, 180B of an eyewear device, on another display (e.g., the image display 580 on a mobile device 401; FIG. 5), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the interactive augmented reality system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 4 is a functional block diagram of an example interactive augmented reality system 400 with dynamic power configuration that includes a wearable device (e.g., an eyewear device 100), a mobile device 401, and a server system 498 connected via various networks 495 such as the Internet. The interactive augmented reality system 400 includes a low-power wireless connection 425 and a high-speed wireless connection 437 between the eyewear device 100 and the mobile device 401.

As shown in FIG. 4, the eyewear device 100 includes a camera system 402 having one or more visible-light cameras 114A, 114B and an image processor 412. The one or more visible-light cameras 114A, 114B capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes a display system 404 that has an image display driver 442 and two image displays of each optical assembly 180A, 180B (one associated with the left side 170A and one associated with the right side 170B). The eyewear device 100 also includes electronics 406, e.g., low-power circuitry 420 and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes a temperature sensor 408 and one or more speakers 440 (e.g., one associated with the left side of the eyewear device and another associated with the right side of the eyewear device). In one example, the temperature sensor 408 includes one or more thermistors positioned within the eyewear device 100 adjacent the electronics 406. The temperature sensor may obtain a single temperature from a single thermistor or aggregate temperatures from multiple thermistors. The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 540 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The interactive augmented reality system 400, as shown in FIG. 4, includes a computing device, such as mobile device 401, coupled to an eyewear device 100 over a network. The interactive augmented reality system 400 includes a memory for storing instructions and a processor for executing the instructions. Execution of the instructions of the interactive augmented reality system 400 by the processor 432 configures the eyewear device 100 to cooperate with the mobile device 401. The interactive augmented reality system 400 may utilize the memory 434 of the eyewear device 100 or the memory elements 540A, 540B, 540C of the mobile device 401 (FIG. 5). Also, the interactive augmented reality system 400 may utilize the processor elements 432, 422 of the eyewear device 100 or the central processing unit (CPU) 530 of the mobile device 401 (FIG. 5). In addition, the interactive augmented reality system 400 may further utilize the memory and processor elements of the server system 498. In this aspect, the memory and processing functions of the interactive augmented reality system 400 can be shared or distributed across the eyewear device 100, the mobile device 401, and the server system 498.

The memory 434 includes song files 482 and virtual objects 484. The song files 482 includes a tempo (e.g., beat track) and, optionally, a sequence of notes and note values. A note is a symbol denoting a particular pitch or other musical sound. The note value includes the duration the note is played, relative to the tempo, and may include other qualities such as loudness, emphasis, articulation, and phrasing relative to other notes. The tempo, in some implementations, includes a default value along with a user interface through which the user may select a particular tempo for use during playback of the song. The virtual objects 484 include image data for identifying objects or features in images captured by the cameras 114. The objects may be physical features such as known paintings or physical markers for use in localizing the eyewear device 100 within an environment.

The memory 434 additionally includes, for execution by the processor 432, power management service 450, position tracking service 451, plane detection service 452, rendering service 453, over-render service 454, display service 455, background service(s) 456, and capture service 457. Power management service 450 manages the thermal operating mode of the eyewear device 100 by changing between at least two power configuration modes (e.g., a normal operating mode and a low power mode). In the normal operating mode, processing resources (e.g., cameras, graphical processing units, displays, processes such as noise reduction, etc.) are all available and operating at a relatively high frame rate (e.g., 60 frames per second). In the lower power mode, one or more processing resources are constrained (e.g., one camera enabled and the other disabled), operate at a relatively low frame rate (e.g., 30 frames per second), processes such as noise reductions are turned off, or a combination thereof.

In one example, in the normal operating mode, when the temperature of the electronic device 100 is below a threshold temperature (e.g., 60 degree Celsius), all services operate in a first operating state (e.g., a normal operating state) that provides the best performance. In accordance with this example, in a low power mode, when the temperature of the electronic device reaches the threshold temperature, the power management service 450 notifies one or more services (e.g., all services) that resources are being constrained and that they should transition/change to operating in a second operating state (e.g., an adaptive state) that provides acceptable performance with less processing resources. Fewer processing resources results in thermal mitigation, which allows the eyewear device 100 to run longer and cooler.

Although examples described herein relate to services having two operating states, services may have more than two operating states, with, for example, different operating states associated with different threshold temperatures and resource constraints (e.g., stepping from both cameras available at 60 frames per second, to both cameras available at 30 frames per second, to one camera available at 30 frames per second). Furthermore, different services may implement different operating states at different threshold temperatures under control of the power management service 451. In accordance with this example, processor 432 running the power management service 451 may utilize a look-up table (not shown) maintained in memory 434 to instruct which service to transition to which state and when to transition.

In one example, the threshold temperature is an internal temperature of the eyewear device 100 near the electronics 406 that correlates to a known hotspot on a surface of the eyewear device 100. In an example, it is desirable to keep the surface temperature of the eyewear device 100 below 43 degrees Celsius, which may correspond to an internal temperature of, for example, 64 degrees Celsius.

Position tracking service 451 determines the position of the eyewear device within an environment and the plane detection service 452 identifies planar surfaces within the environment. The position tracking service 451 and planar detection service 452 may include one or more trackers. In one example, the trackers can be classified into the following three categories:

Uses one camera, e.g., a natural feature tracker, face tracker, etc.

Prefers to use two cameras (stereoscopic), but can operating with one (with potentially degraded performance, e.g., visual odometry (VIO) for six degrees of freedom tracking.

Requires two cameras (stereoscopic), e.g., real-time depth extraction, plane detection.

Multiple position tracking and plane detection services may be simultaneously active. Power consumption (and, thus, heat generation) may be lowered by constraining resource availability and instructing the services to switch from a normal operating state to an adaptive state when the temperature reaches the threshold temperature (e.g., 64 degrees Celsius) to accommodate the power management service 450 constraining resource availability, for example, by disabling one of the cameras when two cameras are not required (e.g., categories 1 and 2 above), reducing the frame rate of the camera(s) (e.g., categories 1, 2, and 3 above), or a combination thereof. When the temperature falls below another threshold temperature (e.g., 61 degrees Celsius), the power management service 450 may restore resource availability by enabling both cameras, increasing the frame rate, or a combination thereof. Additionally, the power management service 450 may notify the services that they can switch to a normal operating state because the resources are no longer constrained.

The rendering service 453 governs how often a new frame is drawn on a graphical processing unit (GPU). In a normal state, a high render frame rate (e.g., 60 frames per second) ensures animations and transitions appear smooth to the user. In an adaptive state, the render frame rate is reduced (e.g., to 30 frames per second) during times of thermal pressure to extend runtime.

The over-render service 454 implements late-warping to reduce motion to photon latency in AR/VR/XR headsets. An over-render border dictates how many pixels outside of the display field of view are rendered, to avoid showing black pixels after late-warping is performed (i.e., to leverage the full display FOV, despite late-warping, e.g., due to rapid head movements). The more pixels that are rendered, the more power that is consumed. In a normal state, a relatively large area outside the display field of view is rendered. In an adaptive state, the area outside the display field of view is reduced or eliminated.

The display service 455 presents images on displays for viewing by a user. In a normal state, the amount of electrical current drawn by display systems is set to a desired level to achieve a desired level of brightness. In an adaptive state, the electrical current is limited (e.g., to 60 percent of the normal state electrical current draw), which trades brightness for thermal reduction). Additionally, processes such as noise reduction are available in a normal state. In the adaptive state, however, one or more of such processes may be turned off to lower power consumption for thermal mitigation. For example, the quality of displayed images may be gradually decreased in order to keep below the thermal limit by turning off noise reduction processes (e.g., separately or in addition to reducing FPS).

The background service(s) 456 run in the background (e.g., uploading or transcoding content) and, thus, are typically less critical/time-sensitive and can be deferred until the eyewear 100 returns to normal operating mode. In a normal state, the background services 456 run when called without constraint. In an adaptive state, when the eyewear is under thermal pressure, background services 456 are differed and only run when necessary.

The capture service 457 captures (i.e., records) AR experiences. In a normal state, the capture service 457 records AR experiences. In an adaptive state, the capture service 457 does not record AR experiences and informs that user that they must first allow the eyewear device 100 to cool down.

The memory 434 additionally includes, for execution by the processor 432, a position detection utility 460, a marker registration utility 462, a localization utility 464, a virtual object rendering utility 466, a physics engine 468, and a prediction engine 470. The position detection utility 460 configures the processor 432 to determine the position (location and orientation) within an environment, e.g., using the localization utility 464. The marker registration utility 462 configures the processor 432 to register markers within the environment. The markers may be predefined physical markers having a known location within an environment or assigned by the processor 432 to a particular location with respect to the environment within which the eyewear device 100 is operating or with respect to the eyewear itself. The localization utility 464 configures the processor 432 to obtain localization data for use in determining the position of the eyewear device 100, virtual objects presented by the eyewear device, or a combination thereof. The location data may be derived from a series of images, an IMU unit 472, a GPS unit 473, or a combination thereof. The virtual object rendering utility 466 configures the processor 432 to render virtual images for display by the image display 180 under control of the image display driver 442 and the image processor 412. The physics engine 468 configures the processor 432 to apply laws of physics such as gravity and friction to the virtual word, e.g., between virtual game pieces. The prediction engine 470 configures the processor 432 to predict anticipated movement of an object such as the eyewear device 100 based on its current heading, input from sensors such as the IMU 472, images of the environment, or a combination thereof.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 constructs a map of the environment surrounding the eyewear device 100, determines a location of the eyewear device within the mapped environment, and determines a relative position of the eyewear device to one or more objects in the mapped environment. In one example, the processor 432 constructs the map and determines location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6:
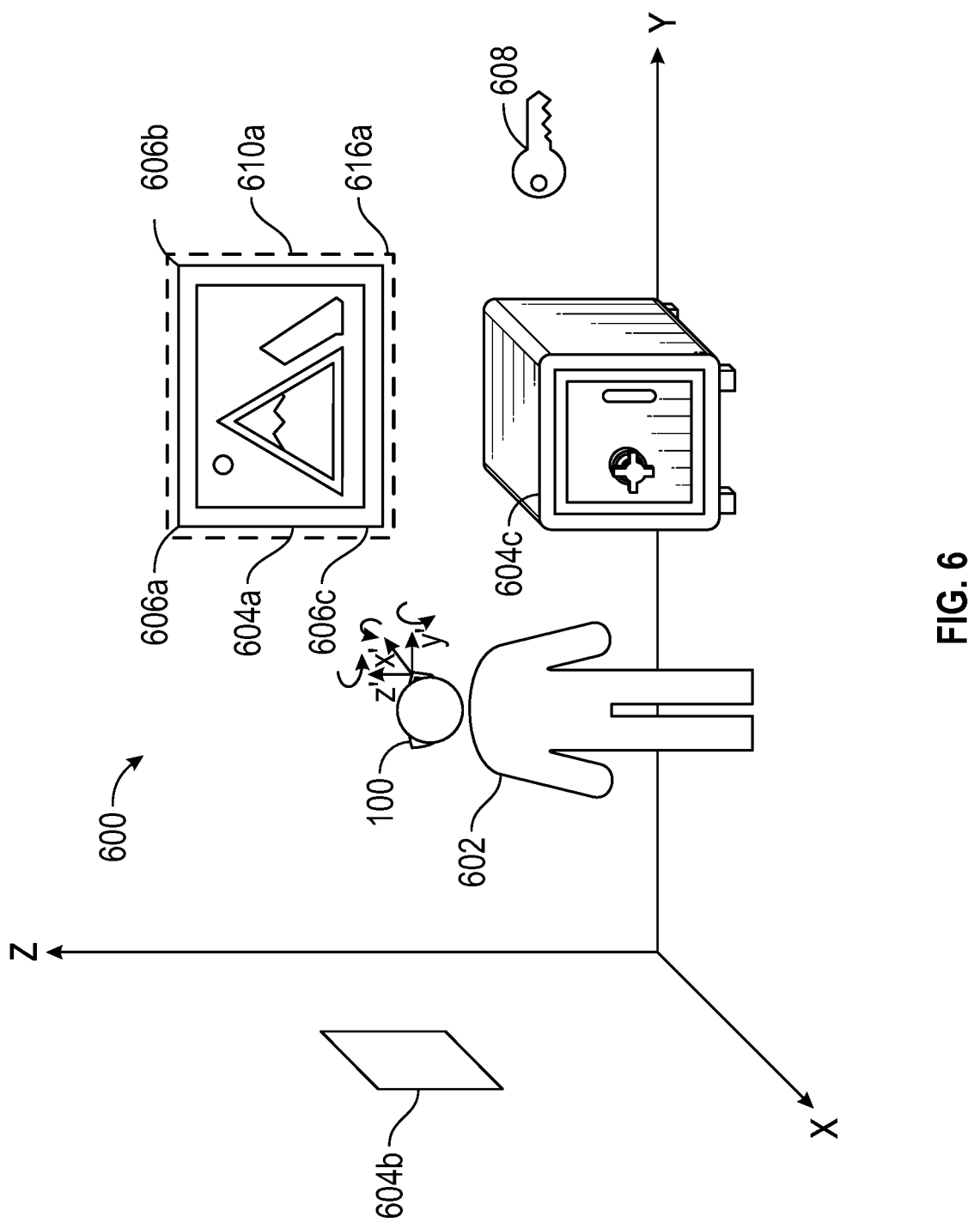
FIG. 6 is a schematic illustration of a user in an example environment for use in describing simultaneous localization and mapping in an augmented reality production system.

FIG. 6 depicts an example environment 600 along with elements that are useful for natural feature tracking (NFT; e.g., a tracking application using a SLAM algorithm). A user 602 of the eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. In one example, the processor 432 of the eyewear device 100 positions a virtual object 484 (such as the key shown in FIG. 6) within the environment 600 for augmented reality viewing via image displays 180.

Figure 7:
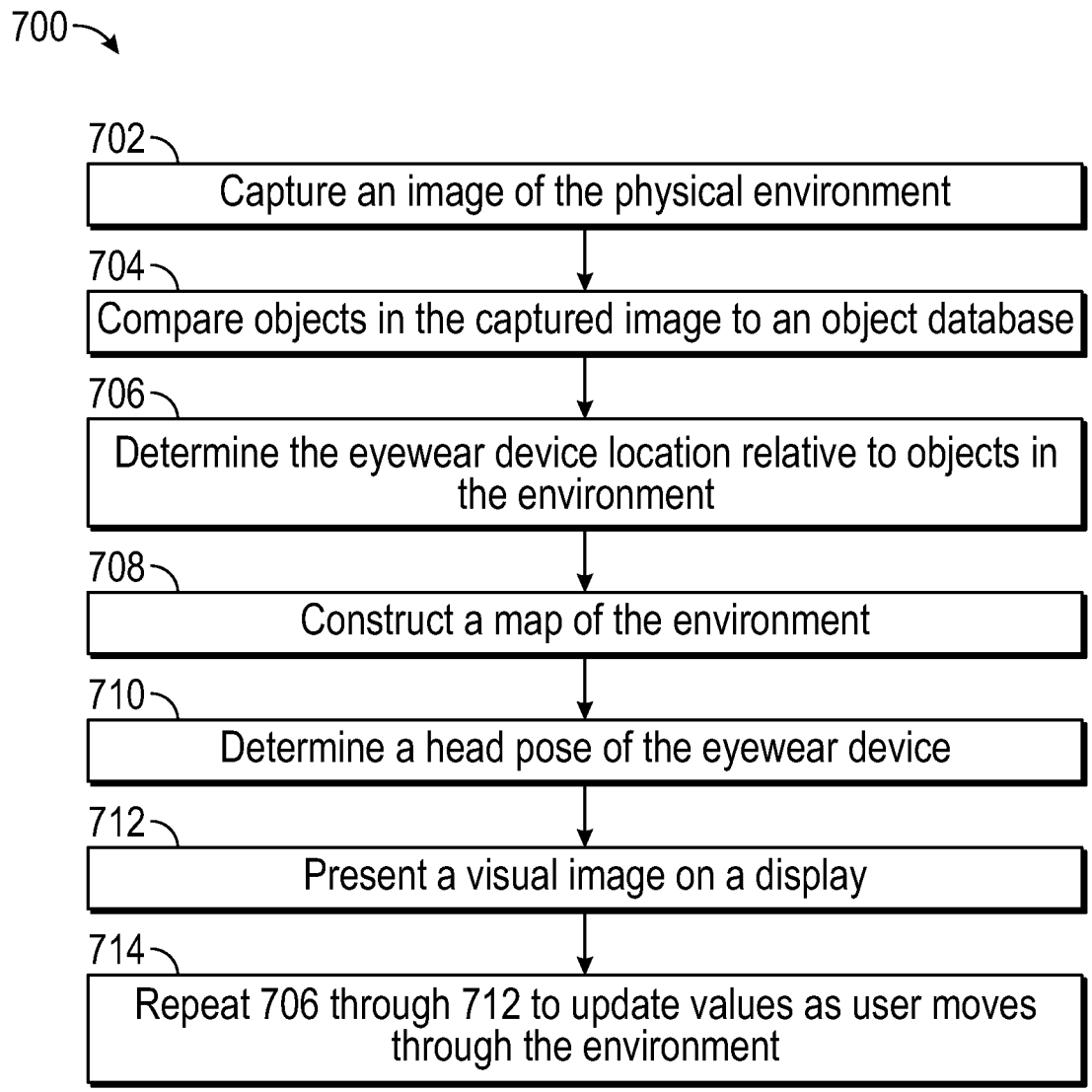
FIG. 7 is a flow chart listing steps in an example method of determining the position of an eyewear device within an environment using a plurality of sensors.

FIG. 7 is a flow chart 700 depicting a method for visual-inertial tracking on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS unit 473, orientation information from an IMU 472, or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database 484.

In one example, the processor 432 is programmed to identify a predefined particular object (e.g., a particular picture 604a hanging in a known location on a wall, a window 604b in another wall, or an object such as a safe 604c positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position with respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Referring again to FIG. 6, the method of implementing augmented reality virtual guidance applications described herein, in this example, includes virtual markers (e.g., virtual marker 610a) associated with physical objects (e.g., painting 604a) and virtual markers associated with virtual objects (e.g., key 608). In one example, an eyewear device 100 uses the markers associated with physical objects to determine the position of the eyewear device 100 within an environment and uses the markers associated with virtual objects to generate overlay images presenting the associated virtual object(s) 608 in the environment 600 at the virtual marker position on the display of the eyewear device 100. For example, markers are registered at locations in the environment for use in tracking and updating the location of users, devices, and objects (virtual and physical) in a mapped environment. Markers are sometimes registered to a high-contrast physical object, such as the relatively dark object 604a mounted on a lighter-colored wall, to assist cameras and other sensors with the task of detecting the marker. The markers may be preassigned or may be assigned by the eyewear device 100 upon entering the environment. Markers are also registered at locations in the environment for use in presenting virtual images at those locations in the mapped environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 8A:
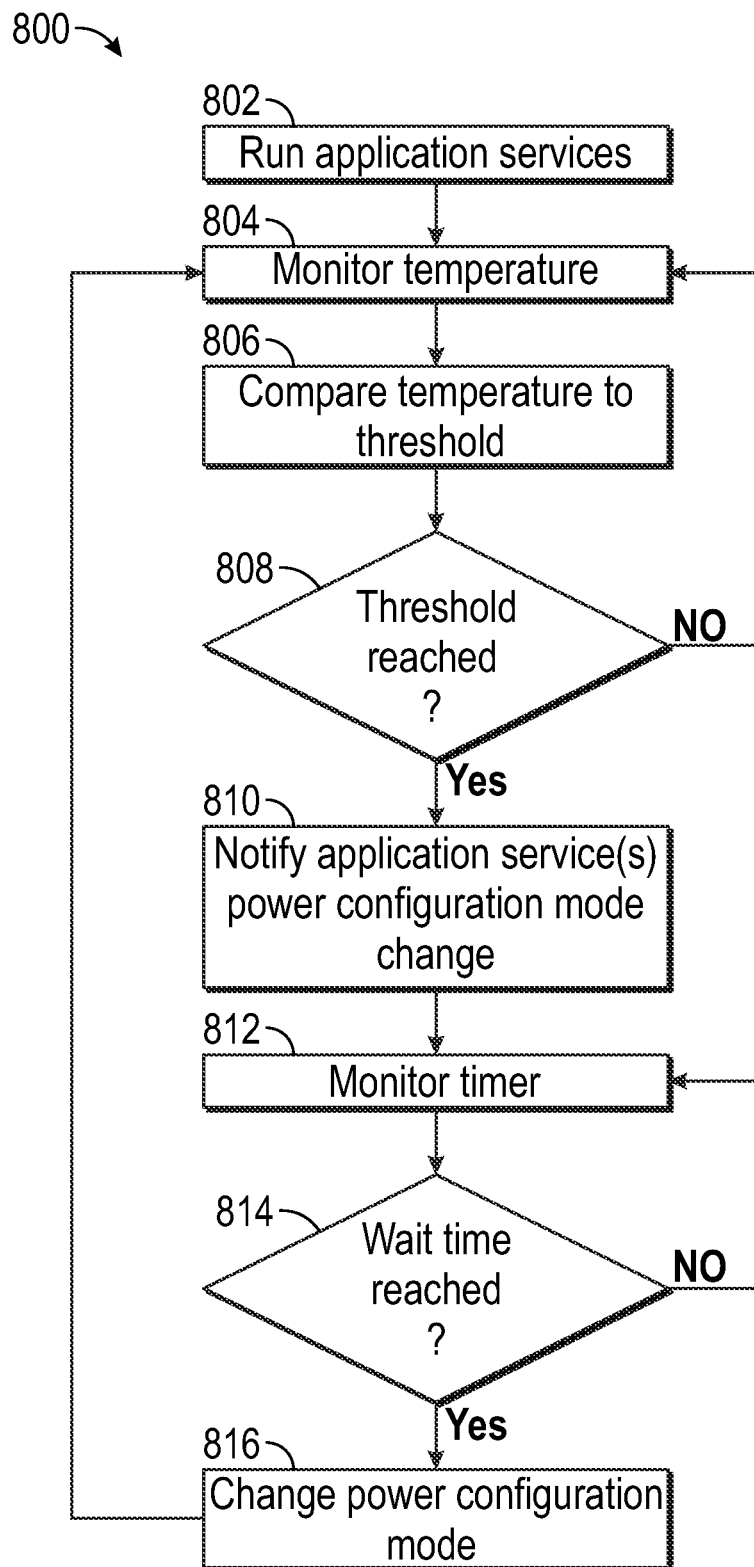
FIGS. 8A and 8B are flow charts listing steps in example methods of dynamic power configuration in wearable electronic devices for thermal management.
Figure 8B:
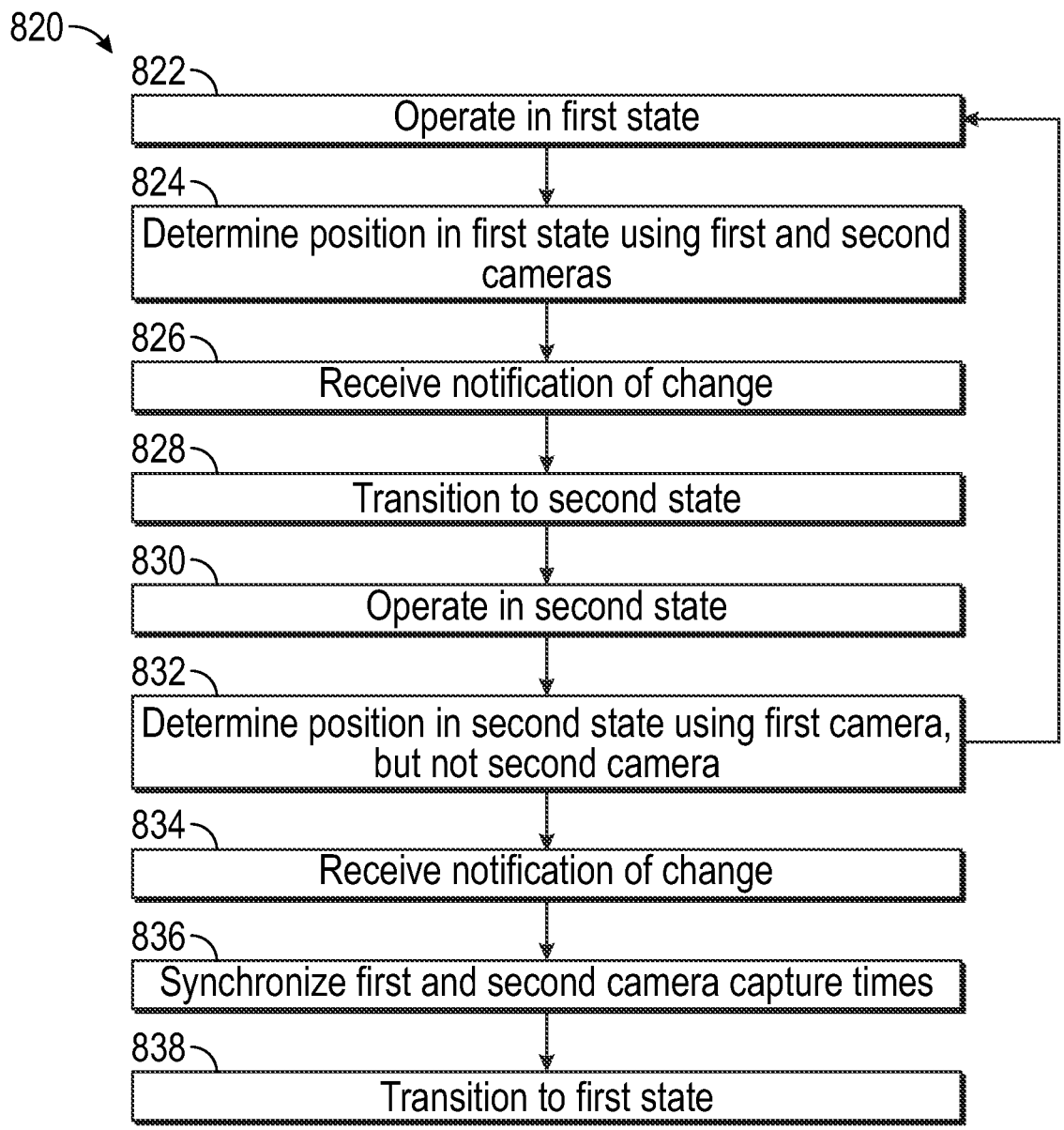

FIGS. 8A and 8B are respective flow charts 800 and 820 listing steps in example methods of dynamic power reduction. The steps of flow chart 800 describe the operation of the power management control system (e.g., power management service 450 implemented by processor 432). The steps of flow chart 820 describe the operation of the services controlled by the power management system (e.g., services 451-457). Although the steps are described with reference to the eyewear device 100, as described herein, other implementations of the steps described, for other types of mobile devices, will be understood by one of skill in the art from the description herein. Additionally, it is contemplated that one or more of the steps shown in FIGS. 8A and 8B, and described herein, may be omitted, performed simultaneously or in a series, performed in an order other than illustrated and described, or performed in conjunction with additional steps.

FIG. 8A is a flow chart 800 illustrating a method for power management (and thermal mitigation). At block 802, the electronics 406 of the eyewear device 100 run application services (e.g., services 450-457). In an example, the processor 432 runs the application services 450-457, with the power management service 450 providing instructions to the other services 451-457 for adapting to the modes of operation in which the eyewear device 100 is operating based on temperature of the eyewear device 100 (e.g., temperature of the electronics 406).

At block 804, the power management service 450 monitors the temperature of the eyewear device 100. In an example, the processor 432, running power management service 450, periodically receives a temperature reading from the temperature sensor 408 (e.g., every 100 ms).

At block 806, the power management service 450 compares the monitored temperature to a threshold. In an example, the processor 432, running the power management service 450, compares the monitored temperature to a threshold temperature stored in memory 434. There may be multiple threshold temperatures depending on the mode in which the eyewear device 100 is operating. For example, when the eyewear device is in normal mode of operation, a first threshold (e.g., of 64 degrees Celsius) may be used to determine when to transition to a low power mode (e.g., due to overheating). Similarly, when the eyewear device is in a low power mode of operation, a second threshold (e.g., of 60 degrees Celsius) may be used to determine when to transition from the low power mode back to the normal mode of operation (e.g., once the temperature has been reduced to an acceptable level). In accordance with this example, the eyewear device 100 may transition between the normal mode of operation and the low power mode of operation to maximize the amount of time the eyewear device is able to operate in the normal mode (e.g., providing the best performance) without overheating.

At decision block 808, the power management service 450 determine whether the threshold has been reached. In an example, the processor 432, running power management service 450, determines whether the threshold has been reached (e.g., using the first threshold if the eyewear device 100 is in the normal mode of operation and using the second threshold if the eyewear device is in the low power mode of operation. If the threshold is reached, processing proceeds at block 810. If the threshold has not been reached, processing proceeds at block 804.

At block 810, the power management service 450 notifies the other application service(s) 451-457 that the power configuration mode of the eyewear device 100 is about to change. In an example, the processor 432, running power management service 450, sends a communication (e.g., via an inter-process communication) to the other application service(s) 451-457.

At block 812, the power management service 450 monitors a timer. In an example, the processor 432, running power management service 450, monitors a timer (e.g., maintained by the processor 432 using a runtime application).

At decision block 814, the power management service 450 determines whether the monitored time has reached a predefined wait time. In an example, the processor 432, running power management service 450, compares the monitored time to a predefined wait time (e.g., five seconds). The predefined wait time is set to give the other application service(s) 451-457 (1) when the normal state—time to transition from the normal state to the adaptive state because all the resources they use during the normal state may no longer be available and (2) when in the adaptive state—time to transitions from the adaptive state to the normal state because additional resources will be coming available. If the wait time is reached, processing proceeds at block 816. If the wait time has not been reached, processing proceeds at block 812.

At block 816, the power management service 450 changes the power configuration mode of the eyewear device. In an example, the processor 432, running power management service 450, changes the power configuration mode of the eyewear device 100. If the eyewear device 100 is in the normal mode of operation, the processor 432 changes the mode of operation to the low power mode of operation (in which available resources are reduced). If the eyewear device 100 is in the low power mode of operation, the processor 432 changes the mode of operation to the normal mode of operation (i.e., in which available resources are increased).

FIG. 8B is a flow chart 820 illustrating an example method for transitioning between operating states of an application service (e.g., one of services 451-457). In this example, the service is a tracking service having a first state (normal state) in which it uses both cameras to determine changes in position and a second state (adaptive state) in which is uses one camera to determine changes in position. Modification of this example method for use with other application services will be understood by one of skill in the art from the description herein.

At block 822, the electronics 406 operate the application service in a first state. In an example, the processor 432, running the application service, operates the application service in the first state (e.g., the normal state). In the first state, the application service is set up for relatively high performance that is designed to utilize resources of the eyewear device when operating in the normal mode of operation (e.g., both cameras operating at 60 frames per second).

At block 824, for a tracking service, the electronics 406 determine position using both a first camera and a second camera. In an example, the processor 432, running the tracking service, determines changes in position of the eyewear device 100 using data from images captured with both cameras 114A-B of the camera system 402 (which are available when the eyewear device 100 is in the normal mode of operation).

At block 826, the application service receives notification of a change. In an example, the application service receives notification of a change from the power management service 450 (e.g., via an inter-process communication).

At block 828, the application service transitions to a second state. In an example, the application service transitions to a second state (e.g., an adaptive state) configured to work with fewer resources due to the eyewear devices changing to low power mode of operation. For example, the application service may change to relying on one camera operating at a slower frame rate for determining position.

At block 830, the electronics 406 operate the application service in a second state. In an example, the processor 432, running the application service, operates the application service in the second state (e.g., the adaptive state). In the second state, the application service is set up for relatively low performance that is designed to utilize resources of the eyewear device when operating in the low power mode of operation (e.g., one camera operating at 30 frames per second).

At block 832, for a tracking service, the electronics 406 determine position using one camera. In an example, the processor 432, running the tracking service, determines changes in position of the eyewear device 100 using data from images captured with one camera 114A of the camera system 402 (which is available when the eyewear device 100 is in the low power mode of operation).

At block 834, the application service receives notification of a change. In an example, the application service receives notification of a change from the power management service 450 (e.g., via an inter-process communication) to transition from the second state back to the first state.

At block 836, the electronics synchronize first and second camera capture times as the second camera comes back on line when the eyewear changes back to the normal mode of operation. In an example, the processor 432, running the tracking service, synchronizes data from the first and second cameras 114A-B of the camera system 402 (which is available when the eyewear device 100 is in the normal mode of operation).

At block 838, the application service transitions back to the first state. In an example, the application service transitions back to the first state (e.g., a normal state) configured to work with more resources due to the eyewear devices changing to the normal mode of operation. For example, the application service may change to relying on both cameras operating at a faster frame rate for determining position.

Aspects of the examples described herein address thermal mitigation in AR eyewear devices. Thermal mitigation in such devices have competing goals, including: (1) ensuring the devices do not exceed certain thermal limits, (2) maximizing thermal runtime of AR experiences, (3) ensuring the devices can continue to operate for as long as possible without overheating, maximizing responsiveness (e.g., the device should not reach the "shut off" thermal limits, instead certain high-power features are disabled to avoid excessive heat, and appear responsive to the user.

Figure 9A:
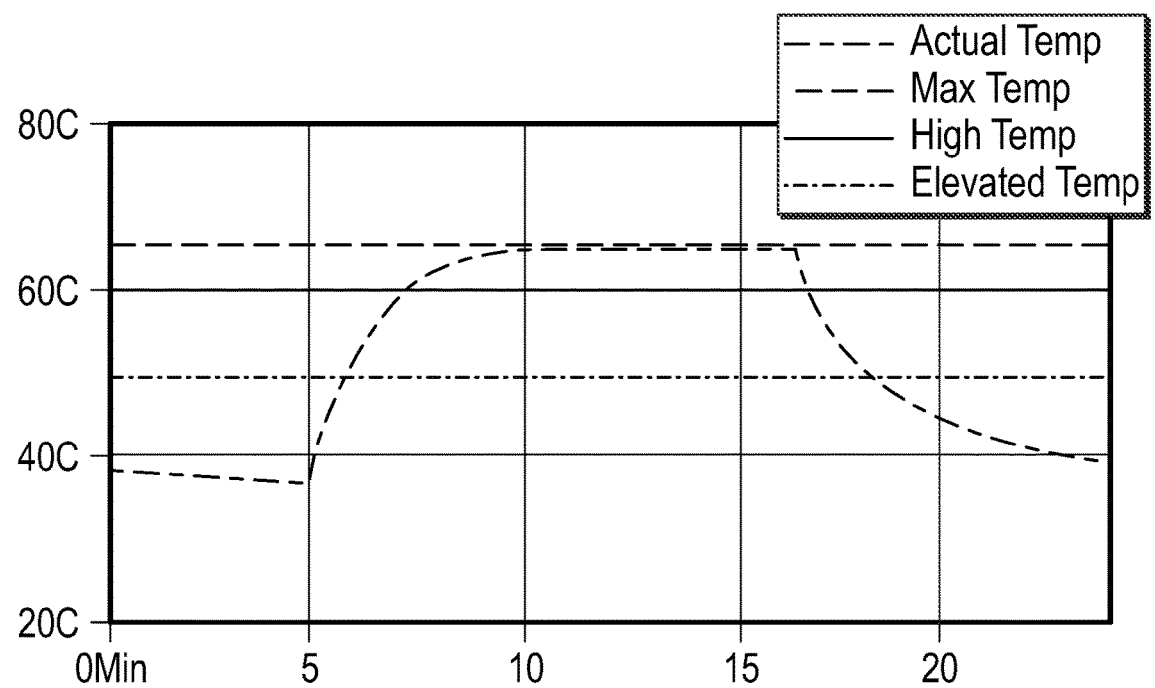
FIGS. 9A and 9B are graphs depicting thermal management in a wearable electronic device.

FIG. 9A depicts an example power management graph. An objective is to avoid reaching the "Max Temp" threshold (which may correspond to a shut off limit). As the Max Temp is approached, processing resources are reduced/throttled to flattening the temperature curve (while still providing sufficient resources for a minimum acceptable level service), thereby extending runtime. The throttling mechanisms are implemented dynamically based on the thermal state of the device to avoid disrupting foregrounded use cases.

Figure 9B:
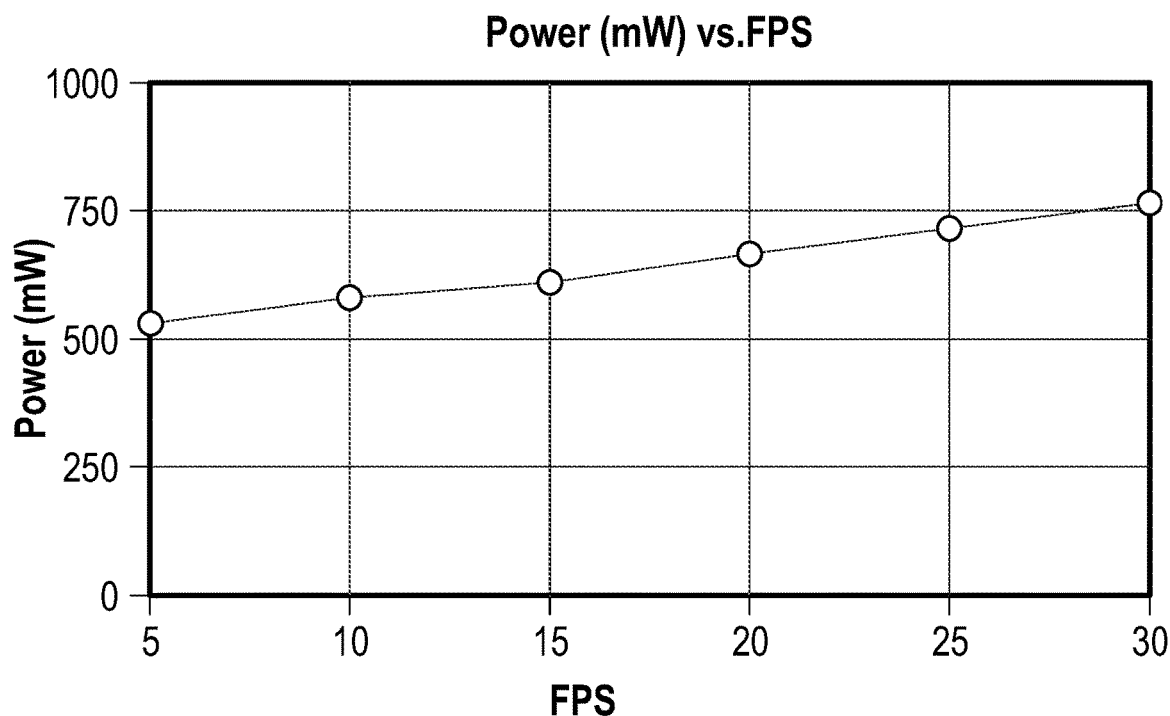

FIG. 9B depicts the effect of varying camera frame rate for stereo cameras. As depicted, power consumption (and temperature generation) increases with frame rate. Thus, lowering the frame rate alone is a useful technique for thermal mitigation. Additionally, power consumption (and temperature generation) increases with more active cameras. Furthermore, processes such a noise reduction also increase power consumption. Thus, having one or more configurations for the eyewear device that includes lowering the frame rate, decreasing the number of active cameras, turning off processes (e.g., noise reductions), or a combination thereof are useful for thermal mitigation.

When thermal pressure is encountered, depending on the use case, the eyewear device switches into one of the lower power camera configurations dynamically, and all trackers are configured to dynamically adapt (i.e., they need to continue to track without disruption, so the augmentations stay persistent on the world).

Any of the functionality described herein can be embodied in one more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device that provides augmented reality services, the eyewear device comprising:
    a frame configured to be worn on a head of a user;
    a camera system supported by the frame, the camera system comprising a first camera and a second camera;
    a display system supported by the frame;
    a temperature sensor supported by the frame, the temperature sensor configured to detect a temperature of the eyewear device; and
    electronics supported by the frame, the electronics coupled to the camera system, the display system, and the temperature sensor, the electronics having at least two power configuration modes and comprising a processing system configured to:
       run application services of the eyewear device, at least one of the application services configured to use at least one of the camera system or the display system;
       monitor the temperature of the temperature sensor;
       compare the monitored temperature to a threshold temperature;
       notify the at least one application service of an upcoming change from a first of the at least two power configuration modes to a second of the at least two power configuration modes responsive to the monitored temperature reaching the threshold temperature; and change the electronics from the first power configuration mode to the second power configuration mode after notifying the at least one application service;

wherein the at least one application service includes a first operating state and a second operating state, the at least one application service changes from the first operating state to the second operating state responsive to the notifying of the upcoming change, the electronics includes a graphical processing unit (GPU) coupled to the display system, the at least one application service is a rendering service configured to render images with the GPU, the first operating state renders images at a first frame rate. and the second operating state renders images at a second frame rate.

2. The eyewear device of claim 1, wherein the at least one application service further comprises a position tracking service, a first operating state of the position tracking service utilizes images from the first camera and the second camera to determine position, and a second operating state of the position tracking service utilizes images from the first camera but not the second camera to determine position.

3. The eyewear device of claim 2, the processing system further configured to:

notify the at least one application service of another upcoming change from the second of the at least two power configuration modes to the first of the at least two power configuration modes responsive to the monitored temperature falling below the threshold temperature; and changing the electronics from the second power configuration mode to the first power configuration mode after notifying the at least one application service;

wherein the at least one application service coordinates frame capture times of the first and second cameras when changing from the second operating state of the position tracking service where images from the first camera but not the second camera are used to determine position to the first operating state of the position tracking service where images from the first and second cameras are used to determine position.

4. The eyewear device of claim 1, wherein the at least one application service further comprises a plane detection service, a first operating state of the plane detection service utilizes images from the first camera and the second camera operating at a first frame capture rate, and a second operating state of the plane detection service utilizes images from the first camera and the second camera operating at a second frame capture rate.

5. The eyewear device of claim 4, wherein the first frame capture rate is higher than the second frame capture rate.

6. The eyewear device of claim 1, wherein the at least one application service further comprises an over-render border service configured to render images outside a field of view of the display system by a number of pixels, a first operating state of the over-render border service renders images outside the field of view for the number of pixels, and a second operating state of the over-render border service reduces or eliminates the number of pixels for rendering images outside the field of view.

7. The eyewear device of claim 2, wherein the at least one application service further comprises a display service configured to control brightness of images presented by the display system, a first operating state of the display service has a first electrical current limit for the display system, and a second operating state of the display service has a second electrical current limit for the display system that is lower than the first electrical current limit.

8. The eyewear device of claim 1, wherein the at least one application service further comprises a background service, a first operating state of the background service is an operational state in which tasks are performed, and a second operating state of the background service is a non-operational state in which the tasks are deferred.

9. The eyewear device of claim 1, wherein the at least one application service further comprisesis a capture service that records an AR experience, a first operating state of the capture service is an operational state in which the AR experience is recorded, a second operating state of the capture service is a non-operational state in which the AR experience is not recorded, and the processing system is further configured to:

present a message with the display system that AR recording is not available when the capture service is in the second operating state of the capture service.

10. The eyewear device of claim 1, wherein the processing system is further configured to:

wait for a predetermined period of time after notifying the application services to transition from the first power configuration mode to the second power configuration mode.

11. A method for use with an eyewear device that provides augmented reality services, the eyewear device comprising a camera system, a display system, and electronics, the method comprising:

running application services on the electronics of the eyewear device, at least one of the application services configured to use at least one of the camera system or the display system;

monitoring a temperature of the eyewear device;

comparing the monitored temperature to a threshold temperature;

notifying the at least one application service of an upcoming change from a first of at least two power configuration modes for the electronics to a second of at least two power configuration modes for the electronics responsive to the monitored temperature reaching the threshold temperature; and changing the electronics from the first power configuration mode to the second power configuration mode after notifying the application services, wherein the at least one application service includes a first operating state and a second operating state; and changing from the first operating state to the second operating state responsive to the notifying of the upcoming change, wherein the electronics includes a graphical processing unit (GPU) coupled to the display system, the at least one application service is a rendering service configured to render images with the GPU, the first operating state renders images at a first frame rate, and the second operating state renders images at a second frame rate.

12. The method of claim 11, wherein the at least one application service further comprises a position tracking service, and the method further comprises:

determining position in a first operating state of the position tracking service utilizing images from the first camera and the second camera; and determining position in a second operating state of the position tracking service utilizing images from the first camera but not the second camera.

13. The method of claim 12, further comprising:
notifying the at least one application service of another upcoming change from the second of the at least two power configuration modes to the first of the at least two power configuration modes responsive to the monitored temperature falling below the threshold temperature;
changing the electronics from the second power configuration mode to the first power configuration mode after notifying the at least one application service;
coordinating frame capture times of the first and second cameras when changing from the second operating state of the pposition tracking service where images from the first camera but not the second camera are used to determine position to the first operating state of the position tracking service where images from the first and second cameras are used to determine position.

14. The method of claim 11, wherein the at least one application service further comprises a plane detection service, a first operating state of the plane detection service utilizes images from the first camera and the second camera operating at a first frame capture rate, and the second operating state of the plane detection service utilizes images from the first camera and the second camera operating at a second frame capture rate.

15. The method of claim 11, wherein the at least one application service further comprises a capture service that records an AR experience, a first operating state of the capture service is an operational state in which the AR experience is recorded, a second operating state of the capture service is a non-operational state in which the AR experience is not recorded, and the method further comprises:
presenting a message with the display system that AR recording is not available when the capture service is in the second operating state.

16. A non-transitory computer readable medium including instructions for configuring an eyewear device that provides augmented reality services, the eyewear device comprising a camera system, a display system, and electronics, the instructions, when executed by a processing system of the eyewear device configure the processing system to perform functions comprising:
running application services on the electronics of the eyewear device, at least one of the application services configured to use at least one of the camera system or the display system;
monitoring a temperature of the eyewear device;
comparing the monitored temperature to a threshold temperature;
notifying the at least one application service of an upcoming change from a first of at least two power configuration modes for the electronics to a second of at least two power configuration modes for the electronics responsive to the monitored temperature reaching the threshold temperature;
changing the electronics from the first power configuration mode to the second power configuration mode after notifying the application services, wherein the at least one application service includes a first operating state and a second operating state; and
changing from the first operating state to the second operating state responsive to the notifying of the upcoming change.
wherein the electronics includes a graphical processing unit (GPU) coupled to the display system, the at least one application service is a rendering service configured to render images with the GPU, the first operating state renders images at a first frame rate, and the second operating state renders images at a second frame rate.

17. The non-transitory computer readable medium of claim 16, wherein the at least one application service further comprises a position tracking service, and the instructions further configure the processor to perform functions comprising:
determining position in a first operating state of the position tracking service utilizing images from the first camera and the second camera; and
determining position in a second operating state of the position tracking service utilizing images from the first camera but not the second camera.

18. The non-transitory computer readable medium of claim 17, wherein the instructions further configure the processor to perform functions comprising:
notifying the at least one application service of another upcoming change from the second of the at least two power configuration modes to the first of the at least two power configuration modes responsive to the monitored temperature falling below the threshold temperature;
changing the electronics from the second power configuration mode to the first power configuration mode after notifying the at least one application service;
coordinating frame capture times of the first and second cameras when changing from the second operating state of the position tracking service where images from the first camera but not the second camera are used to determine position to the first operating state of the position tracking service where images from the first and second cameras are used to determine position.

19. The non-transitory computer readable medium of claim 16, wherein the at least one application service further comprises a plane detection service, a first operating state of the plane detection service utilizes images from the first camera and the second camera operating at a first frame capture rate, and the second operating state of the plane detection service utilizes images from the first camera and the second camera operating at a second frame capture rate.

20. The non-transitory computer readable medium of claim 16, wherein the at least one application service further comprises a capture service that records an AR experience, a first operating state of the capture service is an operational state in which the AR experience is recorded, a second operating state of the capture service is a non-operational state in which the AR experience is not recorded, and the instructions further configure the processor to perform functions comprising:
presenting a message with the display system that AR recording is not available when the capture service is in the second operating state.

* * * * *